United States Patent
Nakamura et al.

(10) Patent No.: US 8,243,121 B2
(45) Date of Patent: Aug. 14, 2012

(54) IMAGE RECORDING APPARATUS AND IMAGE RECORDING METHOD

(75) Inventors: Satoshi Nakamura, Miyagi (JP); Mikio Watanabe, Miyagi (JP); Izumi Miyake, Tokyo (JP); Satoru Okamoto, Miyagi (JP)

(73) Assignee: FUJIFILM Corporation, Tokyo (JP)

( * ) Notice: Subject to any disclaimer, the term of this patent is extended or adjusted under 35 U.S.C. 154(b) by 827 days.

(21) Appl. No.: 12/244,438

(22) Filed: Oct. 2, 2008

(65) Prior Publication Data

US 2009/0091654 A1  Apr. 9, 2009

(30) Foreign Application Priority Data

Oct. 5, 2007  (JP) ................................ 2007-262505

(51) Int. Cl.
*H04N 7/00* (2011.01)
*H04N 7/01* (2006.01)
*H04N 11/20* (2006.01)
*H04N 5/222* (2006.01)

(52) U.S. Cl. ...................... 348/36; 348/445; 348/333.01; 348/333.02; 348/239

(58) Field of Classification Search .................... 348/50, 348/52, 47, 48, 53, 333.01, 333.02, 42, 43, 348/239, 219.1, 218.1; 396/287, 322, 429, 396/324; 382/154
See application file for complete search history.

(56) References Cited

U.S. PATENT DOCUMENTS

| 5,682,198 A | 10/1997 | Katayama et al. |
| 6,335,760 B1 * | 1/2002 | Sato ........................... 348/397.1 |
| 6,507,358 B1 | 1/2003 | Mori et al. |
| 6,867,801 B1 * | 3/2005 | Akasawa et al. ............ 348/222.1 |
| 2004/0239792 A1 * | 12/2004 | Shibutani et al. ........ 348/333.12 |
| 2005/0068346 A1 * | 3/2005 | Ogawa et al. ................. 345/699 |
| 2005/0237383 A1 | 10/2005 | Soga |
| 2006/0187312 A1 * | 8/2006 | Labaziewicz et al. ..... 348/218.1 |
| 2007/0025723 A1 * | 2/2007 | Baudisch et al. ............. 396/287 |
| 2007/0071361 A1 * | 3/2007 | Sanno ........................... 382/298 |

FOREIGN PATENT DOCUMENTS

| EP | 1 519 263 A2 | 3/2005 |
| JP | 7-79379 A | 3/1995 |
| JP | 2000-101916 A | 4/2000 |
| JP | 2004-320614 A | 11/2004 |

(Continued)

OTHER PUBLICATIONS

Japanese Office Action dated Sep. 9, 2011 for Application No. 2007-262505.

*Primary Examiner* — Nicholas Giles
*Assistant Examiner* — Stephen Coleman
(74) *Attorney, Agent, or Firm* — Birch, Stewart, Kolasch & Birch, LLP

(57) ABSTRACT

This aims at providing an image recording apparatus and an image recording method which can output an image suitable for an aspect ratio of a display screen. When connection history data does not fulfill a predetermined condition, predetermined viewpoint image data is selected as a representative image. On the other hand, when the connection history data fulfills the predetermined condition, image data of a plurality of viewpoints taken by the image pickup units are synthesized to generate panoramic image data horizontally wider than the image data of viewpoints, and the generated image data is set as representative image data. Then, the panoramic image file which includes image data of respective viewpoints as sub-image data as well as the representative image data, is generated in the multi-page format, and is recorded in the memory card.

4 Claims, 11 Drawing Sheets

FOREIGN PATENT DOCUMENTS

| | | |
|---|---|---|
| JP | 2005-245018 A | 9/2005 |
| JP | 2005-311789 A | 11/2005 |
| JP | 2006-121229 A | 5/2006 |
| JP | 2007-143064 A | 6/2007 |

* cited by examiner

IMAGE RECORDING APPARATUS AND IMAGE RECORDING METHOD

BACKGROUND OF THE INVENTION

1. Field of the Invention

The present invention relates to an image recording apparatus and an image recording method, and in particular, to an image recording apparatus and an image recording method of storing and recording a plurality of image data in one image file.

2. Description of the Related Art

Japanese Patent Application Laid-Open No. 2000-101916 (claim 2) discloses an electronic still camera which records a plurality of unit images, imaged so that parts may overlap, on a recording medium, and records a synthesized image, synthesized by connecting the unit images, on a recording medium.

Japanese Patent Application Laid-Open No. 2005-311789 discloses a digital camera which synthesizes a plurality of rapid-shot image data to generate panoramic image data.

Japanese Patent Application Laid-Open No. 2006-121229 (claim 5) discloses a stereo camera which synthesizes image data, imaged by two imaging units, to generate one panoramic image.

Japanese Patent Application Laid-Open No. 2005-245018 (FIGS. 2(C) and 4) discloses a camera which records a main image and a sub-image (e.g., a thinning image or a reduction image) in one image file.

SUMMARY OF THE INVENTION

When outputting an image to an image display device so as to reproduce and display the image, it is preferable that an aspect ratio of the image to be reproduced and an aspect ratio of a display screen of an image display device approximate each other. Nevertheless, an aspect ratio of a display screen of an image display device differs every model. For example, image display devices with aspect ratio of 4:3 or those with aspect ratio of 16:9, which are horizontally longer than 4:3, have spread. For this reason, when a panoramic synthetic image, in which a plurality of images are synthesized widely or longwise, is outputted on a display screen whose aspect ratio is 4:3, there are problems that a part of the panoramic synthetic image is not displayed since the panoramic synthetic image is not set within the display screen, and that black portions (padding) are displayed in a top and a bottom, or the like of the screen.

In the above-mentioned Japanese Patent Application Laid-Open No. 2000-101916, Japanese Patent Application Laid-Open No. 2005-311789, Japanese Patent Application Laid-Open No. 2006-121229, and Japanese Patent Application Laid-Open No. 2005-245018, relation between aspect ratios of a panoramic synthetic image and a display screen is not taken into consideration.

The present invention was made in view of such a situation, and aims to provide an image recording apparatus and an image recording method which can output an image suitable for an aspect ratio of a display screen.

In order to solve the above-mentioned problems, an image recording apparatus according to a first aspect of the present invention includes: an image acquisition device which acquires a plurality of image data obtained by taking images in different viewing ranges; a connecting device which connects with an external display device to display and output the image data, and acquires attribute information including information on a display screen in the external display device to which the image data is output; a connection history recording device which records attribute information, acquired from the external display device connected through the connecting device, as connection history information; a generating condition determination device which determines a generating condition of representative image data according to the connection history information; a representative image generating device which generates representative image data according to the generating condition; and an image file generating device which generates an image file which includes the representative image data and a plurality of image data acquired by the image acquisition device.

According to the above-mentioned first aspect, in the image file of storing image data having different views and being obtained by panoramic shots, it is possible to change a generating condition (aspect ratio) of a representative image according to connection history data of the external display device.

According to a second aspect of the present invention, in the image recording apparatus according to the first aspect, the representative image data generating device synthesizes a plurality of image data, acquired by the above-mentioned image acquisition device, as the representative image data according to the connection history data to generate panoramic image data.

According to a third aspect of the present invention, in the image recording apparatus according to the first or second aspect, the representative image data generating device selects one image among a plurality of image data, acquired by the image acquisition device, as the representative image data according to the connection history data.

According to a fourth aspect of the present invention, in the image recording apparatus according to the first to third aspects, the representative image data generating device determines an aspect ratio of the representative image data on the basis of size information of the display screen of the external display device, which is recorded in the connection history data.

According to a fifth aspect of the present invention, in the image recording apparatus according to the first to fourth aspects, the representative image data generating device synthesizes a plurality of image data, acquired by the image acquisition device, to generate panorama image data file as the representative image data when an aspect ratio of an external display device with most number of times of connection is about 16:9 or horizontally wider than 16:9 in the connection history data.

According to a sixth aspect of the present invention, in the image recording apparatus according to the first to fifth aspects, the representative image data generating device synthesizes a plurality of image data, acquired by the image acquisition device, to generate panorama image data as the representative image data when an aspect ratio of an external display device connected finally is about 16:9 or horizontally wider than 16:9 in the connection history data.

According to a seventh aspect of the present invention, in the image recording apparatus according to the first to sixth aspects, the representative image data generating device synthesizes a plurality of image data, acquired by the image acquisition device, to generate panorama image data as the representative image data when there are one or more external display devices whose aspect ratio is about 16:9 or horizontally wider than 16:9 in the connection history data.

According to the above-mentioned fifth to seventh aspects, it is possible to store representative image data suitable for a screen size in an image file when the screen size of an external display device which is an output destination is horizontally wide.

An image recording apparatus according to an eighth aspect of the present invention includes: an image acquisition device which acquires a plurality of image data obtained by taking images in different viewing ranges; a generating condition designation device which receives designation of a generating condition of representative image data; a representative image generating device which generates representative image data from the plurality of image data according to the generating condition; and an image file generating device which generates an image file which includes the representative image data and the plurality of image data acquired by the image acquisition device.

According to the above-mentioned eighth aspect, for image file of storing image data having different views and being obtained by panoramic shots, it is possible to change a generating condition (aspect ratio) of a representative image according to designation of the generating condition.

According to a ninth aspect of the present invention, in the image recording apparatus according to the eighth aspect, the generating condition designation device receives designation of an aspect ratio of the representative image data.

According to a tenth aspect of the present invention, the image recording apparatus according to the eighth aspect or the ninth aspect further includes: a selection device which selects whether image data for a display outputs is generated; an aspect ratio designation device which designate an aspect ratio of the image data for a display output; and an image generating device for a display output which generates image data for a display output. And in the image recording apparatus, the representative image data generating device synthesizes a plurality of image data acquired by the image acquisition device, generates panoramic image data, and sets it as representative image data when the aspect ratio is set as 16:9, and selects representative image data from a plurality of image data, acquired by the image acquisition device, when the aspect ratio is set as 4:3; the image generating device for a display output performs predetermined processing to the representative image data to generate image data for a display output; and the image file generating device stores the image data for a display output in the image file with the representative image data, and the plurality of image data acquired by the image acquisition device.

According to an eleventh aspect of the present invention, in the image recording apparatus according to the tenth aspect, the image generating device for a display output performs any processing of extension, compression, trimming, or padding to the selected image data to generate the image data for a display output.

An image recording method according to a twelfth aspect of the present invention includes: an image acquisition step of acquiring a plurality of image data obtained by taking images in different viewing ranges; a connecting step of connecting with an external display device to display and output the image data, and acquiring attribute information including information on a display screen in the external display device to which the image data is output; a connection history recording step of recording attribute information, acquired from the external display device connected through the connecting step, as connection history information; a generating condition determination step of determining a generating condition of representative image data according to the connection history information; a representative image generating step of generating representative image data according to the generating condition; and an image file generating step of generating an image file which includes the representative image data and the plurality of image data acquired at the image acquisition step.

An image recording method according to a thirteenth aspect of the present invention includes: an image acquisition step of acquiring a plurality of image data obtained by taking images in different viewing ranges; a generating condition designation step of receiving designation of a generating condition of representative image data; a representative image generating step of generating representative image data from the plurality of image data according to the generating condition; and an image file generating step of generating an image file which includes the representative image data and the plurality of image data acquired at the image acquisition step.

According to the present invention, for an image file of storing image data having different views and being obtained by panoramic shots, it is possible to change a generating condition (aspect ratio) of a representative image according to connection history data or setting of an external display device.

DETAILED DESCRIPTION OF THE PREFERRED EMBODIMENTS

Preferable embodiments of an image recording apparatus and an image recording method according to the present invention will be described below according to accompanying drawings.

[First Embodiment]

Figure 1:
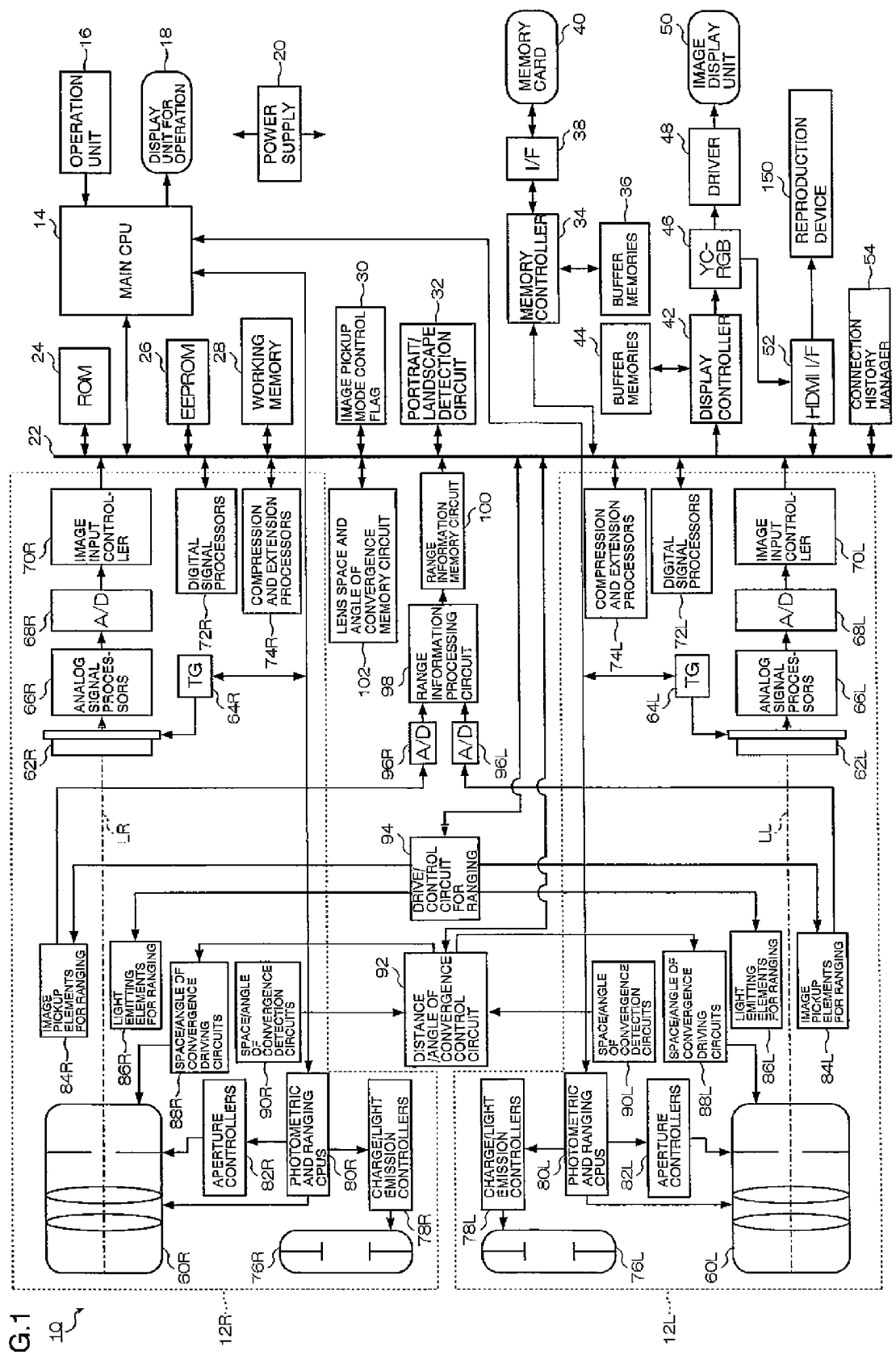
FIG. 1 is a block diagram showing main configuration of an image pickup apparatus (compound eye camera) comprising an image recording apparatus according to a first embodiment of the present invention.

FIG. 1 is a block diagram showing main configuration of an image pickup apparatus (compound eye camera) comprising an image recording apparatus according to a first embodiment of the present invention. As shown in FIG. 1, a image pickup apparatus 10 is a compound eye camera comprising a plurality of image pickup units 12R and 12L, and is an apparatus which acquires parallax images obtained by photographing the same subject from a plurality of viewpoints, and records the parallax images as an image file for recording in a predetermined form. In addition, the image pickup units may be two or more.

A main CPU 14 (hereinafter, this is called a CPU 14) performs integrated control of operations of the whole compound eye camera 10 according to a predetermined control program on the basis of an input from an operation unit 16.

ROM 24, EEPROM 26, and working memory 28 are connected to the CPU 14 through a system bus 22. Various data required for a control program, control and the like which the CPU 14 executes is stored in the ROM 24. Various setting information on operations of the compound eye cameras 10 such as user setting information is stored in the EEPROM 26. The working memory 28 includes an arithmetic operation area of the CPU 14, and a temporary storage of image data.

An image display unit 50 is constructed of, for example, a display unit comprising a color liquid crystal panel, and is used as GUI (Graphical User Interface) at the time of various settings while being used as an image display unit for displaying a picked-up image. In addition, the image display unit 50 is used as an electronic finder for checking an angle of view at the time of an image pickup mode. Furthermore, the image display unit 50 can display a three-dimensional image (3D image).

The operation unit 16 includes operational input units, such as a power supply/mode switch, a mode dial, a release switch, a cross key, a zoom button, a MENU/OK button, a DISP button, and a BACK button.

The power supply/mode switch is a unit for switching ON and OFF of a power supply of the compound eye camera 10, and switching an operation mode (reproduction mode and image pickup mode) of the compound eye camera 10.

The mode dial is an operation unit for switching the image pickup mode of the compound eye camera 10, according to a setting position of the mode dial, the image pickup mode is switched among a panoramic shot mode for taking a panoramic image, a 2D still image pickup mode for taking a two-dimensional still image, a 2D moving image pickup mode for taking two-dimensional moving images, a 3D still image pickup mode for taking a three-dimensional still image, and a 3D moving image pickup mode for taking three-dimensional moving images. When the image pickup mode is set as the panoramic shot mode or 2D moving image pickup mode, a flag which shows that it is in panoramic shot mode is set in the image pickup mode control flag 30. When the image pickup mode is set as the 2D still image pickup mode or 2D moving image pickup mode, a flag which shows that it is in the 2D mode for taking a two-dimensional image is set in the image pickup mode control flag 30. In addition, when the image pickup mode is set as the 3D still image pickup mode or 3D moving image pickup mode, a flag which shows that it is in the 3D mode for taking a three-dimensional image is set in the image pickup mode control flag 30. The CPU 14 discriminates setting of the image pickup mode with reference to the image pickup mode control flag 30.

The release switch is constructed of a two-step stroke type switch constructed of so-called "half press" and "full press". At the time of the still image pickup mode, when the release switch is pressed halfway, image pickup preparation processing (namely, AE (Automatic Exposure), AF (Auto Focus), and AWB (Automatic White Balance)) is performed, when the release switch is pressed fully, image pickup and recording processing of a still image is performed. In addition, at the time of the moving image pickup mode, when the release switch is pressed fully, an image pickup of moving images is started, and when pressed fully again, the image pickup of the moving images is completed. Furthermore, a release switch for a still image pickup, and a release switch for a moving image pickup may be provided separately.

The cross key is an operation unit which is made it possible to be pressed and operated in four directions, that is, the up, down, left, and right, and functions are assigned to respective directional buttons according to the operation mode of the compound eye camera 10. For example, at the time of the image pickup mode, a function of switching ON and OFF of a macro function is assigned to the left button, and a function of switching a flash mode to the right button is assigned. In addition, at the time of the image pickup mode, a function of changing brightness of the image display unit 50 is assigned to the up button, and a function of switching ON/OFF of a self-timer is assigned to the down button. At the time of the reproduction mode, a function of frame advance is assigned to the left button and a function of frame back is assigned to the right button. Furthermore, at the time of the reproduction mode, a function of changing brightness of the image display unit 50 is assigned to the up button, and a function of deleting a reproducing image is assigned to the down button. Moreover, at the time of various settings, a function of moving a cursor displayed on the image display unit 50 in a direction of each button is assigned.

The zoom button is an operation unit for performing zooming operations of the image pickup units 12R and 12L, and comprises a tele zoom button which specifies zooming to a telephoto side, and a wide zoom button which specifies the zooming to a wide-angle side.

The MENU/OK button is used for decision of selection content, an execution instruction (O.K. function) of processing, and the like while being used for a call (MENU function) of a menu screen, and an assigned function is switched according to a set state of the compound eye camera 10. On the menu screen, the MENU/OK button sets all the adjustment items which the compound eye camera 10 has, all the adjustment items including, for example, an exposure value, a tint, ISO speed, picture quality adjustment such as a record pixel count, setup of the self-timer, switching of a metering system, use/no use of digital zoom, and the like, The compound eye camera 10 operates according to a condition set on this menu screen.

The DISP button is used for an input of a switching command of display content of the image display unit 50, and the like and the BACK button is used for an input of a command for cancel of an input operation, and the like.

Next, image pickup functions of the compound eye camera 10 will be described. In addition, although reference numeral R or L is applied to each portion of the respective image pickup units 12R and 12L, which is distinguished, in FIG. 1, since the function of each portion is approximately the same, the reference numerals R and L are omitted in the following descriptions.

An image pickup lens 60 comprises a zoom lens, a focus lens, and a diaphragm. The zoom lens and focus lens move forward and backward along an optical axis (LK and LL in the figure) of each image pickup unit. The CPU 14 controls a position of the zoom lens to perform zooming by controlling drive of a zoom actuator, not shown, through a photometric and ranging CPU 80, and controls a position of the focus lens to perform focusing by controlling drive of a focus actuator through the photometric and ranging CPU 80. In addition, the CPU 14 controls an opening amount (f-stop number) of a diaphragm to control incident light quantity to an image pickup element 62, by controlling drive of a diaphragm actuator through the photometric and ranging CPU 80.

When taking images of a plurality of viewpoints at the time of the panoramic shot mode or 3D mode, the CPU 14 synchronizes and drives image pickup lenses 60R and 60L of the respective image pickup units 12R and 12L. That is, the image pickup lenses 60K and 60L are set at the always same focal length (zoom magnifying power). In addition, the apertures are adjusted so as to become always the same incident light quantity (f-stop number). Furthermore, in the 3D mode, focusing is performed so that always the same subject may be focused.

A flash light emitting unit 76 includes, for example, a discharge tube (xenon tube) and emits light if needed, that is, in the case of taking an image of a dark subject, backlight, or the like. A charge/emission control unit 78 includes a main capacitor for supplying a current for making the flash light emitting unit 76 emit a light. The CPU 14 transmits a flash light emission command to the photometric and ranging CPU 80, and performs charge control of the main capacitor, and control of timing of discharge (light emission), discharge duration, and the like of the flash light emitting unit 76. In addition, as the flash light emitting unit 76, a light emitting diode may be used.

The image pickup unit 12 comprises a light emitting element 86 (e.g., light emitting diode) for ranging for irradiating a subject, and an image pickup element 84 for ranging which takes an image (image for ranging) of the subject which is irradiated by the above-mentioned light emitting element 86 for ranging.

The photometric and ranging CPU 80 controls the image pickup element 84 for ranging to make it take an image for ranging while making the light emitting element 86 for ranging emit light in predetermined timing on the basis of a command from the CPU 14.

The image for ranging taken by the image pickup element 84 for ranging is converted into digital data by an A/D converter 96, and is inputted into a range information processing circuit 98.

The range information processing circuit 98 calculates a distance (subject distance) between a subject, which is taken by the image pickup units 12R and 12L, and the compound eye camera 10 on the basis of a so-called principle of trigonometrical survey using the image for ranging acquired from the image pickup element 84 for ranging. The subject distance calculated by the range information processing circuit 98 is recorded in a range information record circuit 100.

In addition, as a calculation method of a subject distance, a TOF (Time of Flight) method of calculating the subject distance from light flight time (lag time) when light radiated from the light emitting element 86 for ranging is reflected by a subject and reaches the image pickup element 84 for ranging, and speed of light may be used.

Furthermore, the image pickup unit 12 comprises a space/angle of convergence driving circuit 88, and a space/angle of convergence detection circuit 90.

The space/angle of convergence driving circuits 88R and 88L drive the image pickup units 12R and 12L, respectively. The CPU 14 operates the space/angle of convergence driving circuits 88R and 88L through a space/angle of convergence control circuit 92 to adjust a space and an angle of convergence between the image pickup lenses 60R and 60L.

The space/angle of convergence detection circuits 90R and 90L include, for example, a unit of transmitting and receiving an electric wave. The CPU 14 measures the space and angle of convergence between the image pickup lenses 60R and 60L by operating the space/angle of convergence detection circuits 90R and 90L through the space/angle of convergence control circuit 92, so that the space/angle of convergence detection circuits 90R and 90L transmit and receive an electric wave mutually. The measurements of the space and angle of convergence between the image pickup lenses 60R and 60L are stored in a lens space and angle of convergence memory circuit 102.

The image pickup element 62 is constructed of a color CCD solid-state image pickup element for example. In a light-receiving surface of the image pickup element 62, many photodiodes are arranged two-dimensionally and the trichromatic (R, G, B) light filter is arranged in predetermined arrangement on each of the photodiodes. An optical image of a subject imaged on the light-receiving surface of the image pickup element 62 with the image pickup lens 60 is converted into signal charges according to incident light quantity by these photodiodes. The signal charges stored in respective photodiodes are read from the image pickup element 62 one by one as voltage signals (R, G, and B signals) according to the signal charges on the basis of driving pulses given from a TG 64 according to a command of the CPU 14. Since the image pickup element 62 comprises an electronic shutter function, exposure time (shutter speed) is controlled by controlling charge storage time to the photodiodes.

In addition, as the image pickup element 62, an image pickup element other than a CCD, such as a CMOS sensor, can be also used.

An analog signal processor 66 includes a correlative double sampling circuit (CDS) for removing reset noise (low frequency) included in the R, G, and B signals outputted from the image pickup element 62, and an AGS circuit for amplifying the R, G, and B signals and controls them in a constant level of amplitude. The analog R, G, and B signals outputted from the image pickup element 62 are amplified by an analog signal processor 66 while being given correlative double sampling processing. The analog R, 0, and B signals outputted from the analog signal processor 66 are converted into digital R, G, and B signals to be inputted into an image input controller (buffer memory) 70 by an A/D converter 68.

A digital signal processor 72 includes a synchronization circuit (processing circuit of interpolating spatial shifts of carrier chrominance signals accompanying a color filter array of a single plate CCD and converting the carrier chrominance signals into a simultaneous type), a white balance adjustment circuit, a gradation conversion processing circuit (gamma corrector), a contour correction circuit, a luminance and color differential signal generating circuit, and the like. The digital R, G, and B signals inputted into the image input controller 70 are converted into a Y/C signal which is constructed of a luminance signal (Y signal) and color difference signals (Cr and Cb signals) while being given predetermined processing, such as synchronization processing, white balance adjustment, gradation conversion, and contour correction, by the digital signal processor 72.

When displaying a live view image (pass-through image) on the image display unit 50, sequential supply of the Y/C signal generated in the digital signal processor 72 is performed to buffer memory 44. A display controller 42 reads the Y/C signal supplied to the buffer memory 44, and outputs it to the YC-RGB conversion unit 46. The YC-RGB conversion unit 46 converts into R, 0, and B signals the Y/C signal inputted from the display controller 42, and outputs them to the image display unit 50 through a driver 48. Thereby, a through image is displayed on the image display unit 50.

At the time of reproduction mode, a final image file (image file recorded at the end) recorded on a memory card 40 is read, is extended into a non-compressed Y/C signal by a compression and extension processor 74, and thereafter, is inputted into the buffer memory 44. The display controller 42 reads the Y/C signal supplied to the buffer memory 44, and outputs it to the YC-RGB conversion unit 46. The YC-RGB conversion unit 46 converts into R. G, and B signals the Y/C signal inputted from the display controller 42, and outputs them to the image display unit 50 through the driver 48. Thereby, an image file recorded in the memory card 40 is displayed on the image display unit 50.

The compound eye camera 10 comprises an HDMI I/F (High-Definition Multimedia Interface) 52. When a reproduction device (e.g., a television set or a monitor) 150 is connected through the HDMI I/F 52, R, G, and B signals generated in the YC-RGB conversion unit 46 are outputted to the reproduction device 150. Thereby, it is possible to output an image recorded in the memory card 40 to a desired reproduction device 150 from the compound eye camera 10, and to make it reproduced and displayed.

Next, an image pickup and recording processing of an image will be described. An image for recording is taken by one predetermined image pickup unit (e.g., 12R) at the time of the 2D mode. At the time of the 2D mode, the image taken by the image pickup unit 12R is compressed by the compression and extension processor 74R. This compressed image data is recorded in the memory card 40 as an image file in a predetermined format through a memory controller 34 and an interface unit (I/F) 38. For example, a still image is recorded in JPEG (Joint Photographic Experts Group) and moving images are done in MPEG-2 or MPEG-4, that is, as a compressed image file in conformity with the H.264 standard.

At the time of the 3D mode, images are taken by the image pickup units 12R and 12L synchronously. In addition, at the time of the 3D mode, AF processing and AE processing are performed on the basis of an image signal acquired by either of the image pickup units 12R and 12L. At the time of the 3D mode, two viewpoints of images taken by the respective image pickup units 12R and 12L are compressed by the compression and extension processors 74R and 74L respectively, and are stored in one 3D image file (multi-page file) to be recorded in the memory card 40. Furthermore, subject distance information and information on a space and an angle of convergence of the image pickup lenses 60R and 60L are stored in the 3D image file with the two viewpoints of compressed image data.

Next, the recording processing of images taken in the panoramic shot mode will be described. At the time of the panoramic shot mode, two viewpoints of images are taken synchronously by the image pickup units 12R and 12L. In addition, at the time of the panoramic shot mode, the AF processing and AE processing are performed on the basis of an image signal acquired by either of the image pickup units 12R and 12L. At the time of the panoramic shot mode, two viewpoints of images taken by the respective image pickup units 12R and 12L are compressed by the compression and extension processors 74R and 74L respectively, and are stored in one panoramic image file (multi-page file) to be recorded in the memory card 40. Furthermore, representative image data, subject distance information, and information on a space and an angle of convergence of the image pickup lenses 60K and 60L are stored in the panoramic image file with the two viewpoints of compressed image data.

When the reproduction device 150 is connected through the HDMI I/F 52, the CPU 14 acquires attribute information of the reproduction device 150, and records the attribute information (connection history) of the reproduction device 150, having been connected in the past, on the connection history manager 54. Then, the CPU 14 determines size (aspect ratio) of the representative image data stored in the panoramic image file on the basis of this connection history.

Here, the acquisition methods of the attribute information of the reproduction device 150 include a system called Display Data Channel (DDC) which VESA (Video Electronics Standards Association) defined. According to the DDC, when the reproduction device 150 is connected, the attribute information which includes a resolution of a display screen of the reproduction device 150 is transmitted in a data format of Extended Display Identification Data (EDID) from the reproduction device 150 to the compound eye camera 10. Thereby, the compound eye camera 10 can acquire the attribute information of the reproduction device 150.

TABLE 1

| 2007/09/01 00:30:12 | 1920 × 1080 | ABC Full HD |
| 2007/09/10 10:15:45 | 1366 × 768 | DEF HD LCD |
| 2007/09/13 20:07:03 | 1600 × 1200 | GHI PC Monitor |
| 2007/09/20 09:00:58 | 800 × 600 | JKL LCD-1 |
| 2007/10/12 15:30:22 | 1280 × 768 | MNO HD-3S |

Table 1 shows connection history data. As shown in Table 1, as the attribute information of the reproduction device 150, the date and hour when the reproduction device 150 was connected, the resolution (aspect ratio) of a display screen of the connected reproduction device 150, and identification information (e.g., model name) of the reproduction device 150 are recorded from the left of Table 1.

Figure 2:
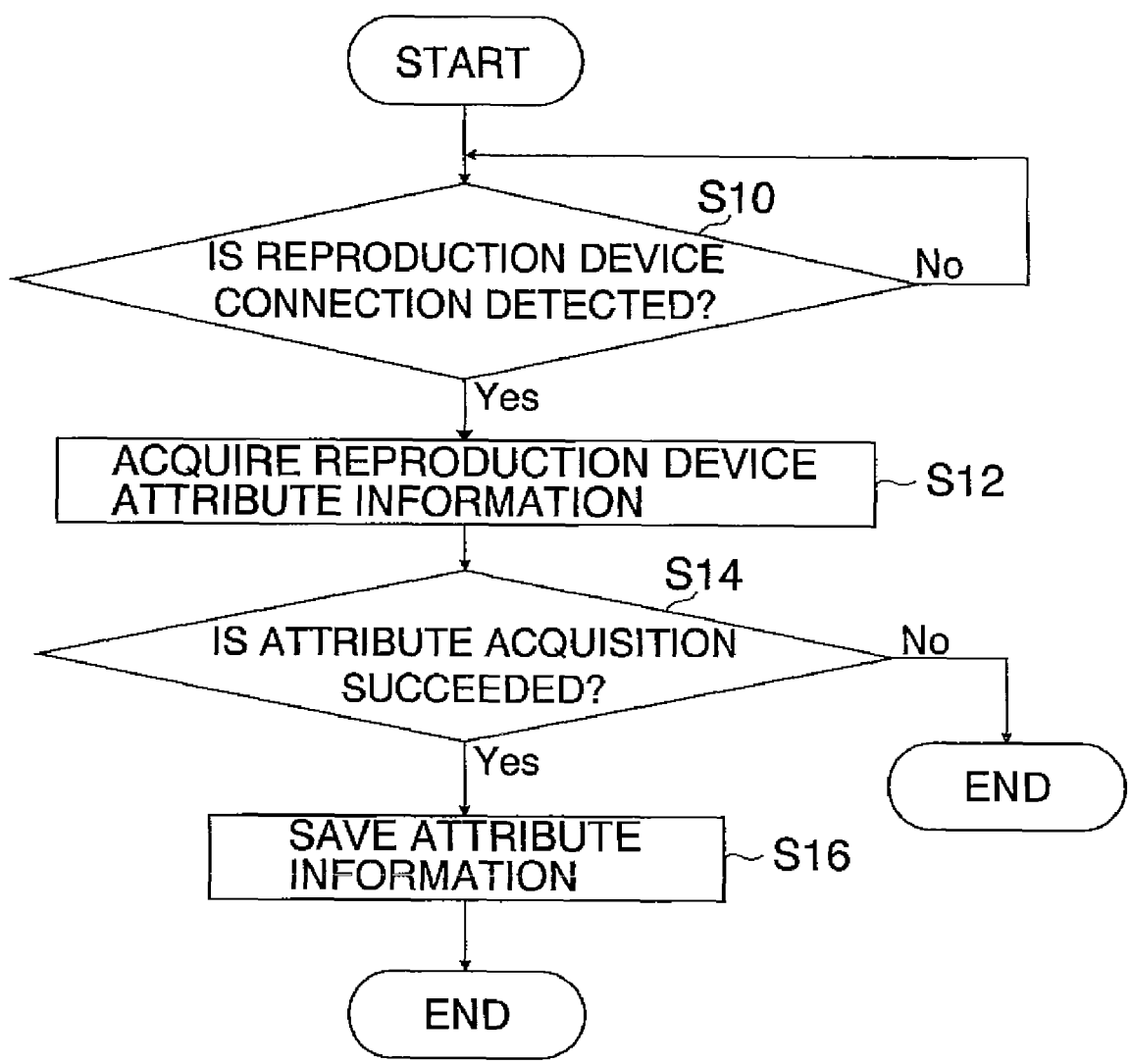
FIG. 2 is a flowchart showing a flow of recording processing of connection history of a reproduction device 150.

FIG. 2 is a flowchart showing a flow of recording processing of the connection history of the reproduction device 150. First, when it is detected (Yes at step S10) that the reproduction device 150 is connected to the compound eye camera 10 through the HDMI I/F 52, the attribute information of the reproduction device 150 is acquired (step S12). Then, when acquisition of the attribute information is successful (Yes of step S814), the connection date and hour, the resolution (aspect ratio) of the display screen of the reproduction device 150, and the identification information of the reproduction device 150 are recorded in the connection history manager 54 (step S16).

Figure 3:
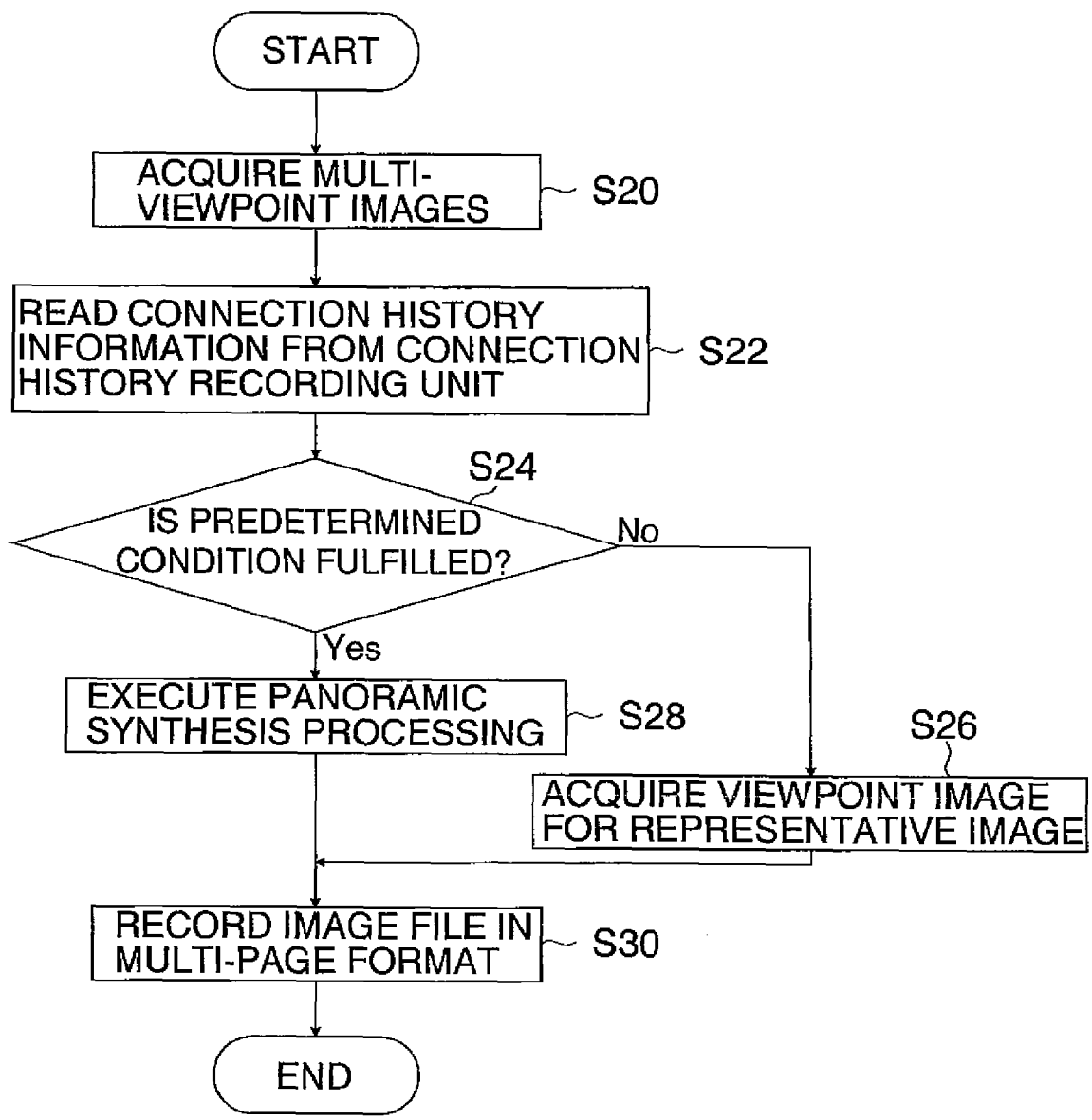
FIG. 3 is a flowchart showing a flow of generation processing of a panoramic image file.

FIG. 3 is a flowchart showing a flow of generation processing of a panoramic image file. First, when images are taken in the panoramic shot mode and two viewpoints of image data are acquired (step S20), connection history data is read from the connection history manager 54 (step S22). Next, when the connection history data does not fulfill a predetermined condition (No at step S24), predetermined viewpoint image data is selected as a representative image (step S26). On the other hand, when the connection history data fulfills the predetermined condition (Yes at step S24), two viewpoints of image data taken by the image pickup units 12R and 12L is synthesized, panoramic image data wider than the viewpoint image data is generated, and it is set as representative image data (step S28). Then, while the representative image data is stored, the panoramic image file in the multi-page format in which respective viewpoint image data is stored as sub-image data is generated, and is recorded in the memory card 40 (step S30).

Here, at step S24, when it is supposed to be outputted on a wide display screen (e.g., in one case of any one among (a) a case that an aspect ratio of a reproduction device with a largest number of times of connection is wider than about 16:9 or horizontally wider than 16:9 in the connection history data of Table 1, (b) a case that an aspect ratio of a reproduction device connected at the end is about 16:9 or horizontally wider than 16:9, and (c) a case that the number of reproduction devices whose aspect ratios are about 16:9 or horizontally wider than 16:9 is one or more in the connection history), wide panoramic image data is made to be representative image data (step S28). And when it is supposed to be outputted to a display screen whose aspect ratio is about 4:3 (when the conditions (a) to (c) are not fulfilled at all), one image data among the viewpoint image data is set as representative image data (step S26). In addition, the conditions of judgment at step S24 are not limited to the above, for example, when at least one of the above-mentioned conditions (a), (b), and (c) is fulfilled (condition (d)), the wide panoramic image data may be made to be representative image data (step S28), and when the above-mentioned condition (d) is not fulfilled, one image data among the viewpoint image data may be set as representative image data (step S26).

Figure 4:
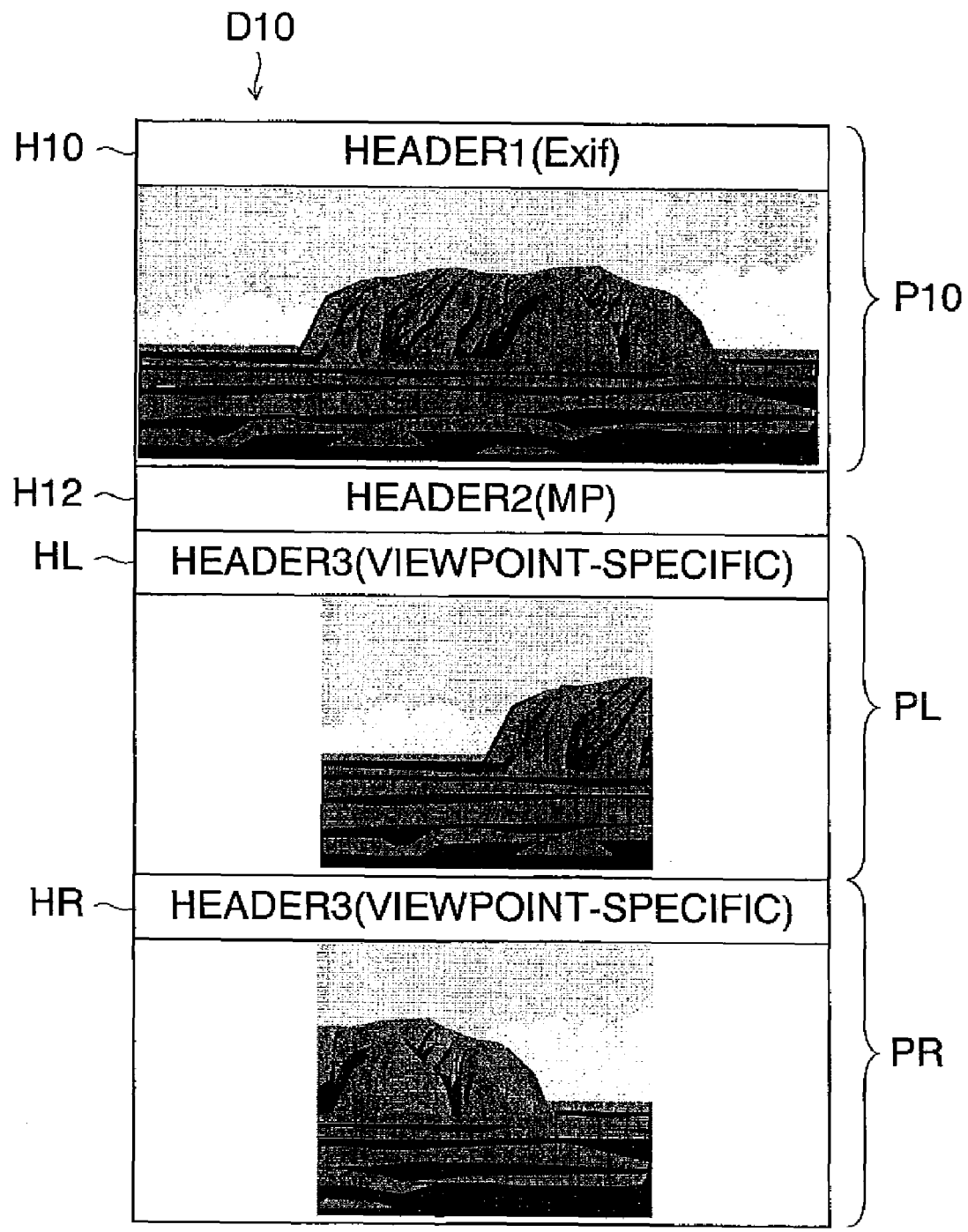
FIG. 4 is a drawing showing a panoramic image file which includes panoramic image data as a representative image.

FIG. 4 is a drawing showing a panoramic image file which includes panoramic image data as a representative image. As shown in FIG. 4, representative image data P10 and right and left viewpoint image data PL and PR taken by the image pickup units 12L and 12R is included in a panoramic image file D10 in order. The representative image data P10 is wide (e.g., 16:9) panoramic image data which is synthesized by superposing parts of left and right viewpoint image data PL and PR.

In addition, reference numerals H10, HL, and HR in the drawing denote header information (Exif tag information) applied to the representative image data P10, and the viewpoint image data PL and PR, respectively. In addition, reference numeral H12 denotes a header including a marker which shows a recording place (address) of the viewpoint image data PL and PR in a panoramic image file.

Figure 5:
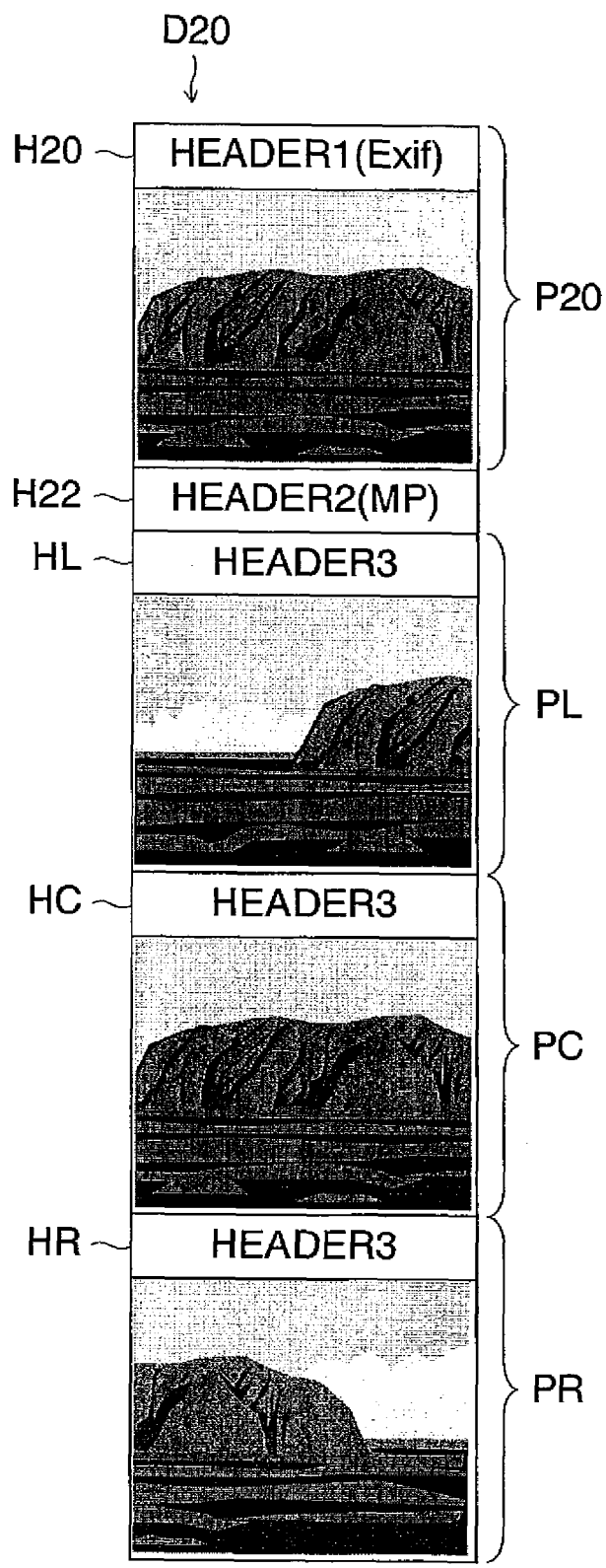
FIG. 5 is a drawing showing a panoramic image file which includes one of viewpoint image data among a plurality of viewpoint image data, as a representative image.

FIG. 5 is a drawing showing a panoramic image file which includes one of viewpoint image data among a plurality of viewpoint image data, as a representative image. Three viewpoints of image data PL, PC, and PR is included in a panoramic image file D20 shown in FIG. 5, and an image file taken by a central viewpoint of image pickup unit among these is stored as representative image data P20.

Here, as the representative image data P20, for example, an image, taken by an image pickup unit whose view position is middle or near the middle, among viewpoint image data, or image data taken by an image pickup unit in a side of user's dominant eye (e.g., default setting is a right eye) among a middle or nearly middle viewpoint of image data is selected.

In addition, reference numeral H20 in the drawing denotes header information (Exif tag information) applied to the representative image data P20.

Figure 6:
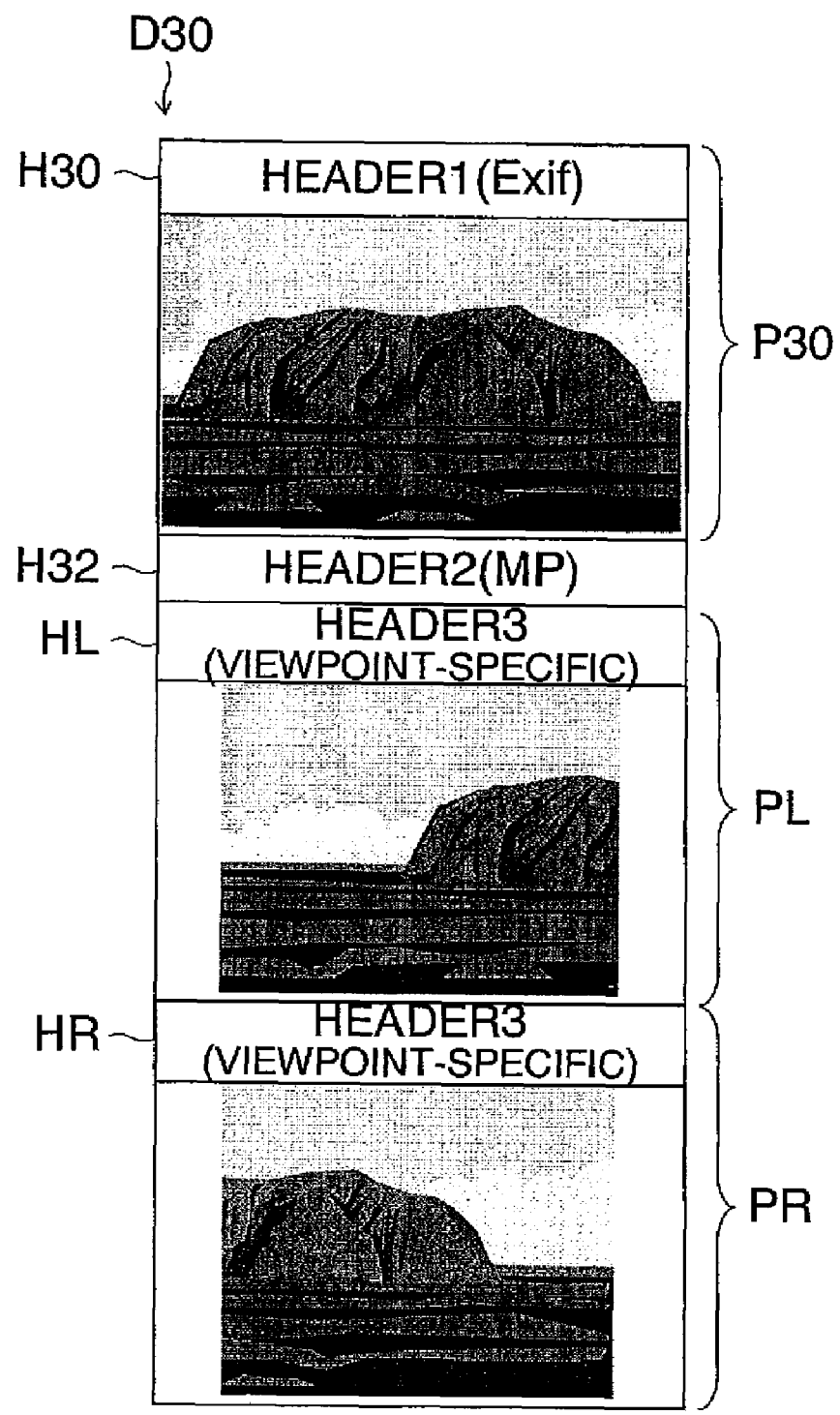
FIG. 6 is a drawing showing another embodiment of a panoramic image file.

Furthermore, in this embodiment, when it is supposed to be outputted to a display screen whose aspect ratio is about 4:3 (a case of No at step S24 of FIG. 3), as shown in FIG. 6, it is also good to include image data P30 which is obtained by trimming right and left end portions of panoramic image data, as representative image data.

According to this embodiment, for example, when it is supposed on the basis of connection history data that an image is outputted to a reproduction device 150 with a wide display screen, since it is made that wide panoramic image data is stored as a representative image, it is possible to record an image suitable for an aspect ratio of the display screen of the reproduction device 150 which is an output destination.

[Second Embodiment]

Next, a second embodiment of the present invention will be described. In this embodiment, a generating condition of a representative image file is set manually.

Figure 7:
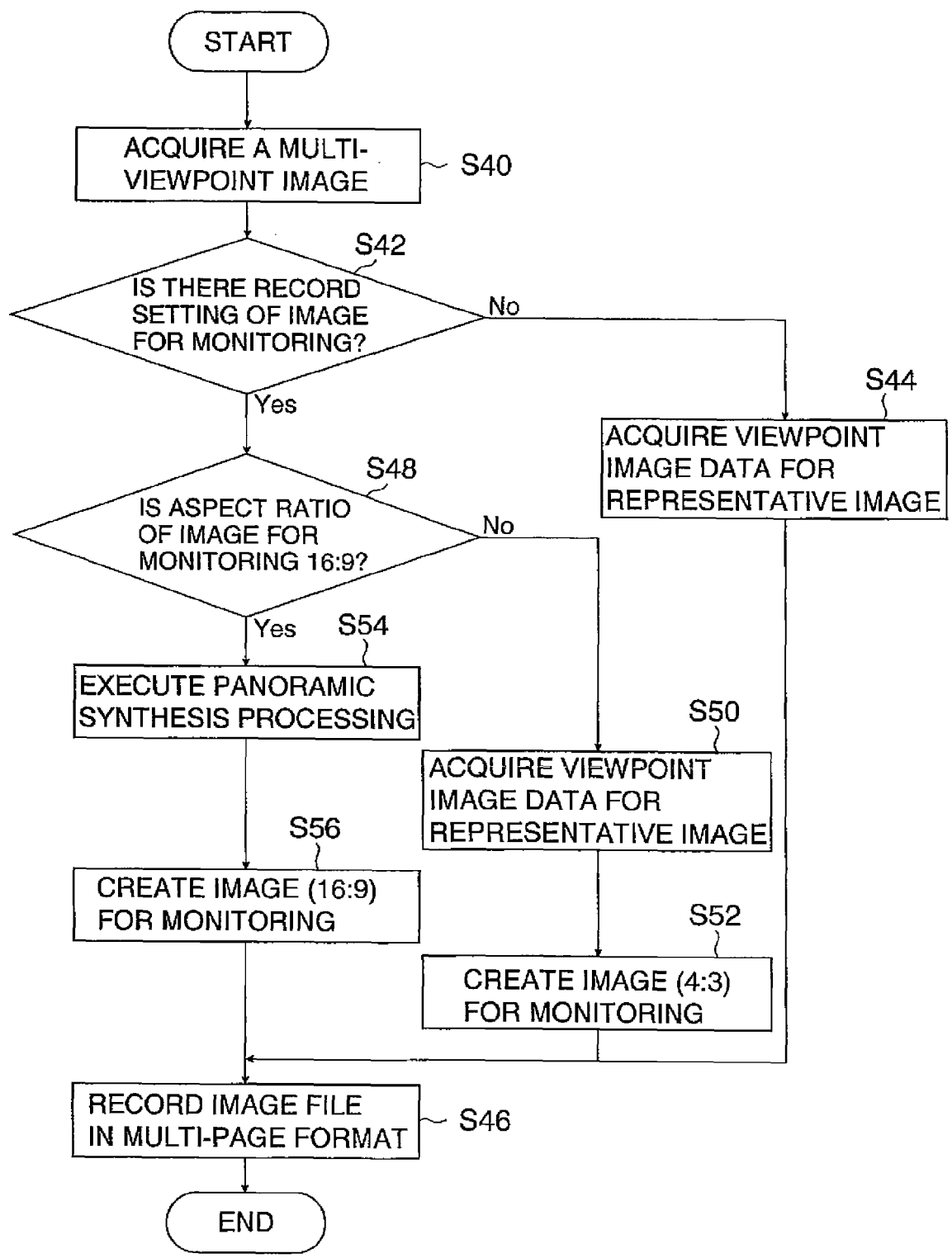
FIG. 7 is a flowchart showing generation processing of image data for monitoring.
Figure 8:
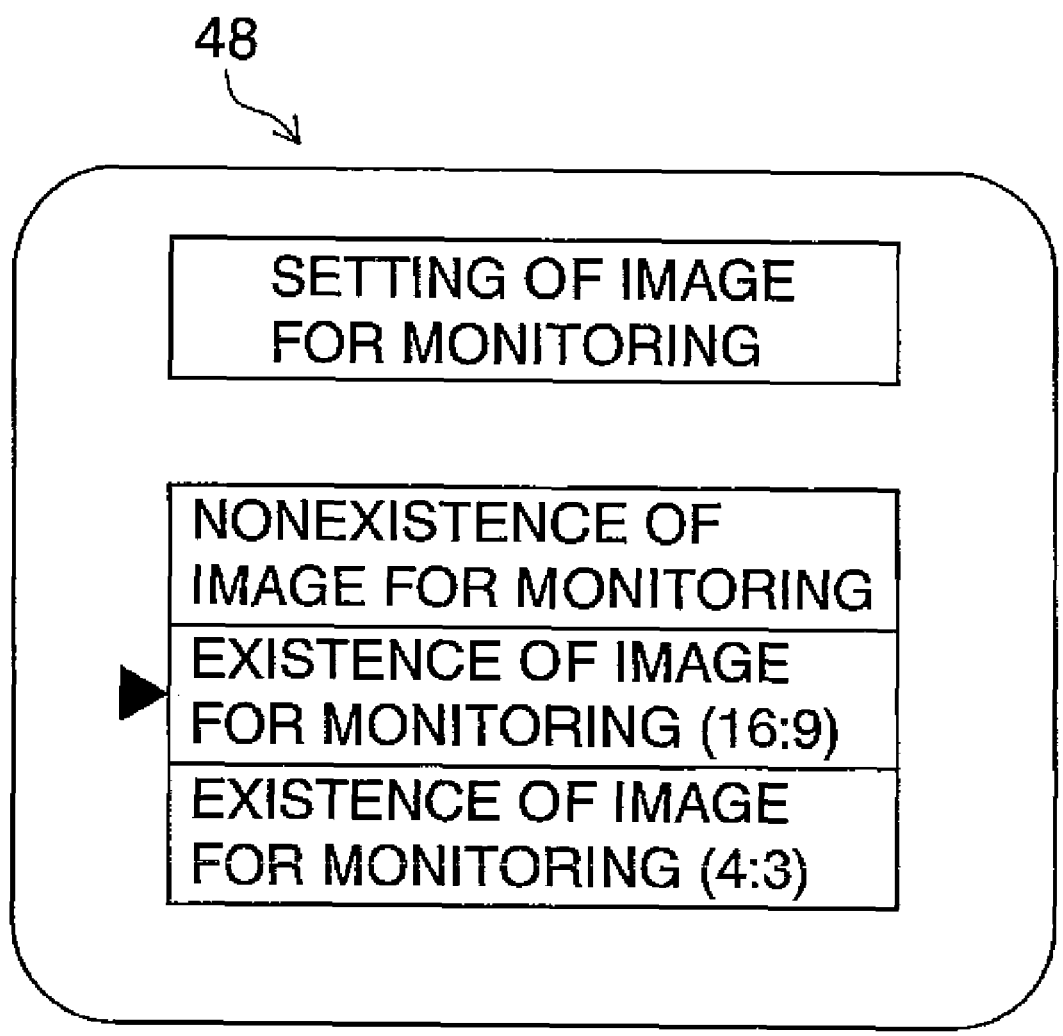
FIG. 8 is an example of an image setting screen for monitoring.

FIG. 7 is a flowchart showing generation processing of image data for monitoring. First, when images are taken in the panoramic shot mode and two viewpoints of image data is acquired (step S40), it is judged whether setting of an image for monitoring is set as "Existence of image for monitoring" (step S42). In a setting screen of an image for monitoring shown in FIG. 8, when it is set as "Nonexistence of image for monitoring" (No at step S42), one among viewpoint image data is selected as representative image data (step S44). Then, while the representative image data is stored, a panoramic image file in the multi-page format in which respective viewpoint image data is stored as sub-image data is generated, and is recorded in the memory card 40 (step S46). In addition, at step S44, similarly to the above-mentioned embodiment, as the representative image data, for example, an image, taken by an image pickup unit whose view position is middle or near the middle, among viewpoint image data, or image data taken by an image pickup unit in a side of user's dominant eye (e.g., default setting is a right eye; however a user can arbitrarily set the dominant eye) among a middle or nearly middle viewpoint of image data is selected.

On the other hand, at step S42, when recording setting of an image for monitoring is set as "Existence of image for monitoring" (Yes at step S42) and an aspect ratio of the image for monitoring is set at 4:3 (No at step S48), one among viewpoint image data is selected as representative image data (step S50). In addition, the selection method of the representative image data at step S50 is the same as that at step S44.

Next, predetermined processing (e.g., at least one processing among enlargement, reduction, trimming, and padding) is given to the representative image data selected at step S42 for an image for monitoring with an aspect ratio of about 4:3 is generated (step S52). Then, a panoramic image file in the multi-page format in which representative image data, image data for display, and respective viewpoint image data are stored is generated, and is recorded in the memory card 40 (step S46).

On the other hand, when the aspect ratio of an image for monitoring is set at 16:9 at step S48, two viewpoints of image data taken by the image pickup units 12R and 12L is synthesized, panoramic image data wider than the viewpoint image data is generated, and it is set as representative image data (step S54).

Next, predetermined processing (e.g., at least one processing among enlargement, reduction, trimming, and padding) is given to the representative image data generated at step S54 for an image for monitoring with an aspect ratio of about 16:9 is generated (step S56). Then, a panoramic image file in the multi-page format in which representative image data, image data for display, and respective viewpoint image data are stored is generated, and is recorded in the memory card 40 (step S46).

Figure 9:
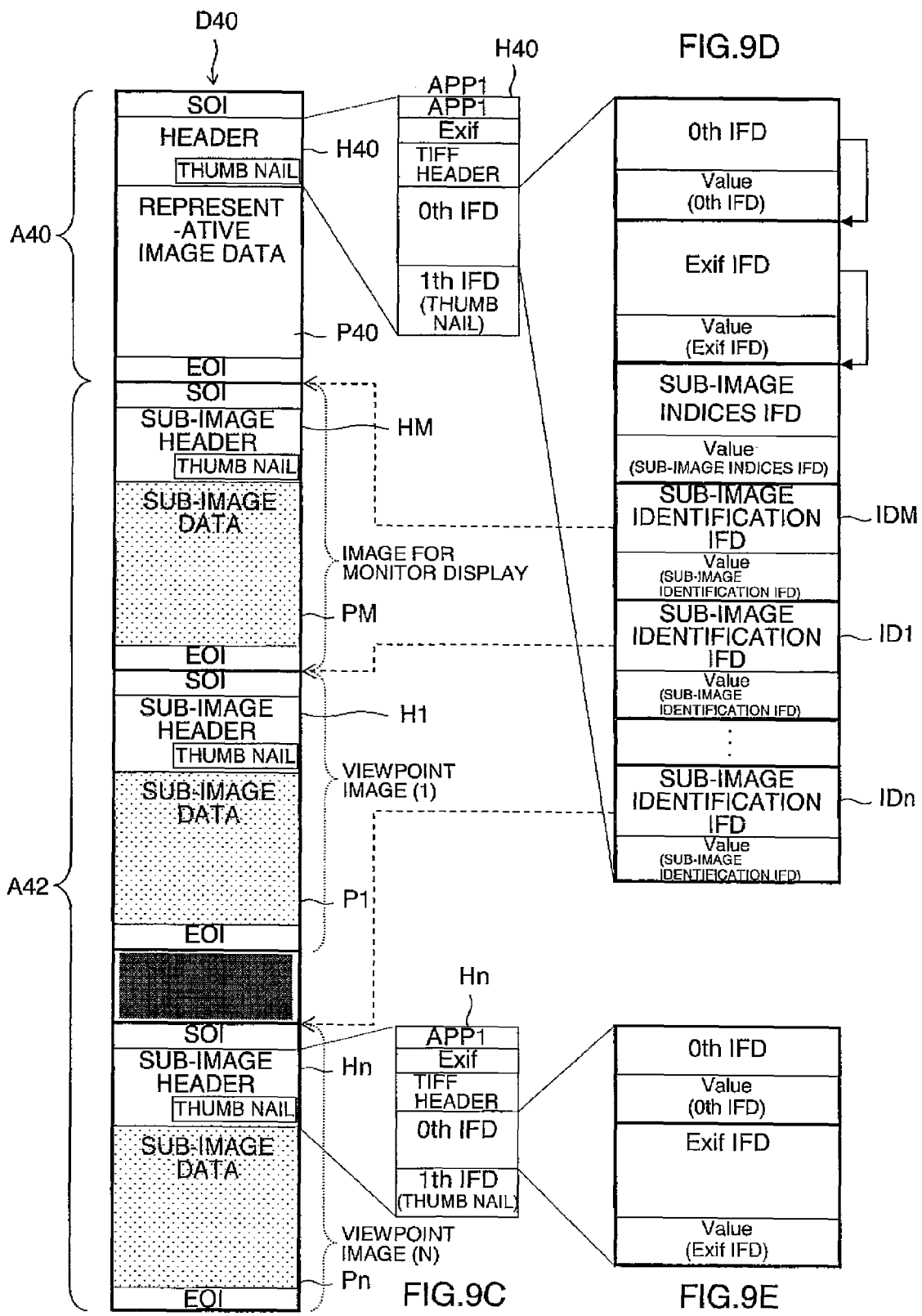
FIGS. 9A to 9E are drawings showing data structure of a panoramic image file according to a second embodiment of the present invention.

FIGS. 9A to 9E are drawings showing data structure of a panoramic image file according to the second embodiment of the present invention. As shown in FIG. 9A, a representative image data storage area A40 and sub-image data storage area A42 are provided in a panoramic image file D40.

Image data PM for monitoring is stored in a top of the sub-image data storage area A42. The image data PM for monitoring is generated by giving the predetermined processing (e.g., at least one processing among enlargement, reduction, trimming, and padding) to the representative image data P40 according to the aspect ratio set on the setting screen of an image for monitoring in FIG. 8.

For example, when the aspect ratio of image data PM for monitoring is set at 4:3, representative image data becomes the same size as that of viewpoint image data (1600×1200), and the size of the image data for monitoring is set at 640× 480, for example. In addition, when the aspect ratio of image data PM for monitoring is set at 16:9, representative image data becomes panoramic size (3600×1200) which is wider than viewpoint image data (1600×1200), and the size of the image data for monitoring becomes 1920×1080, for example.

According to this embodiment, it is possible to set aspect ratios of image data for monitoring and representative image data manually, and to record the representative image data according to display screen size and an aspect ratio of the reproduction device 150 which is an output destination. In addition, processing of generating image data for monitoring from representative image data is omissible by storing in panoramic image data the image data for monitor display, whose pixel count is dropped, in addition to representative image data.

[Third Embodiment]

Although the example of applying the image recording apparatus according to the present invention to the compound eye camera 10 is described in the above-mentioned embodiment, the image recording apparatus according to the present invention is also applicable to a single-lens camera or an image processing device like a personal computer.

Figure 10:
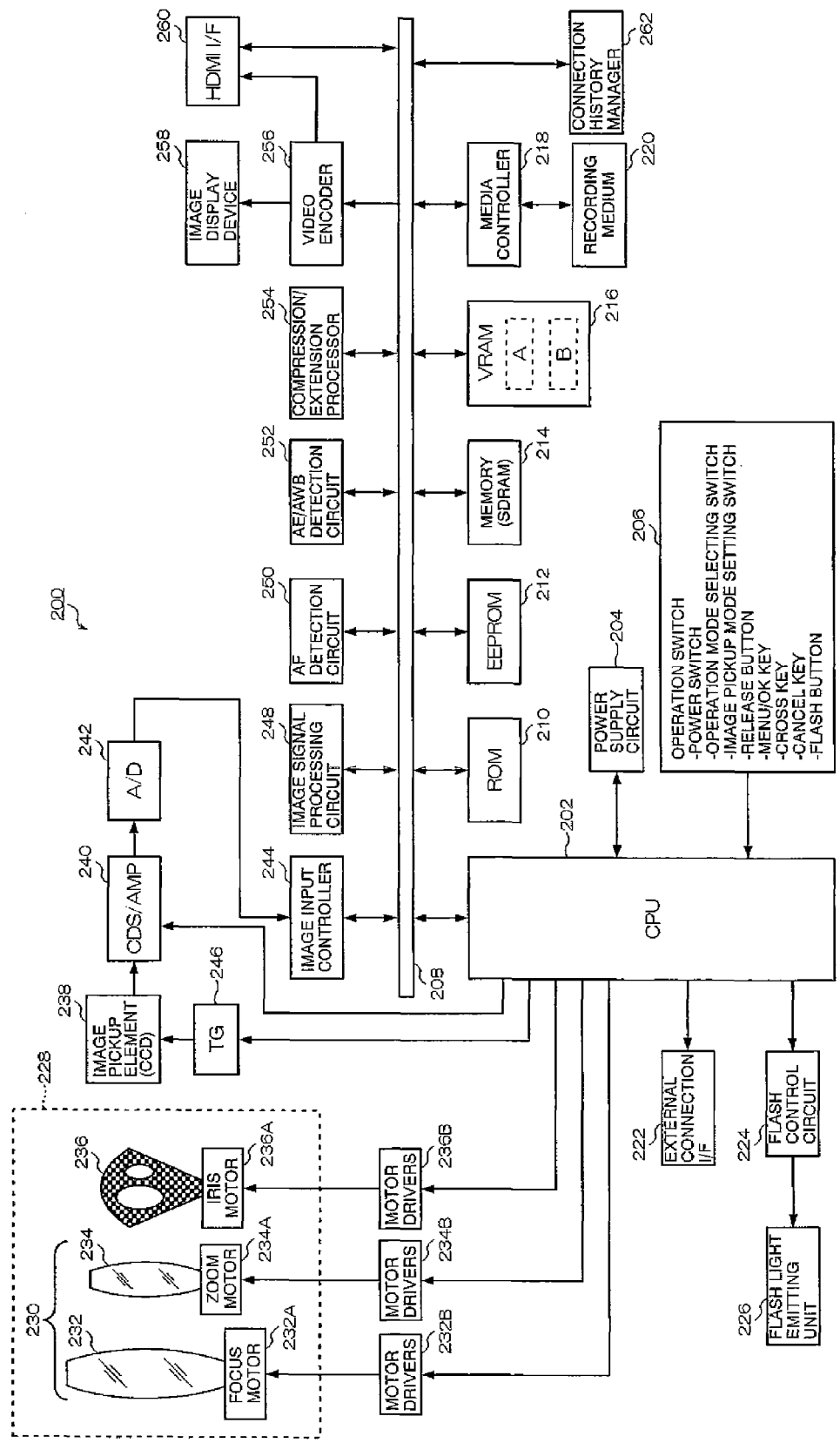
FIG. 10 is a block diagram showing main configuration of a single-lens camera comprising an image recording apparatus according to the present invention.

FIG. 10 is a block diagram showing main configuration of a single-lens camera comprising the image recording apparatus according to the present invention. As shown in FIG. 10, a single-lens camera 200 comprises, for example, an HDMI I/F 260 and a connection history manager 262.

In the case of taking a panoramic image by the single-lens camera 200 shown in FIG. 10, an image pickup mode is set in the panoramic shot mode, and, for example, still images are rapidly shot with moving the single-lens camera horizontally (panning). A CPU 202 synthesizes a plurality of image data rapidly shot at the time of the panoramic shot mode to generate panoramic image data.

Also in the single-lens camera 200 shown in FIG. 10, the image recording apparatus of the present invention is achievable by executing the processing shown in above-mentioned FIGS. 2, 3, and 7 to a plurality of viewpoint image data rapidly shot in the panoramic shot mode.

[Fourth Embodiment]

Figure 11:
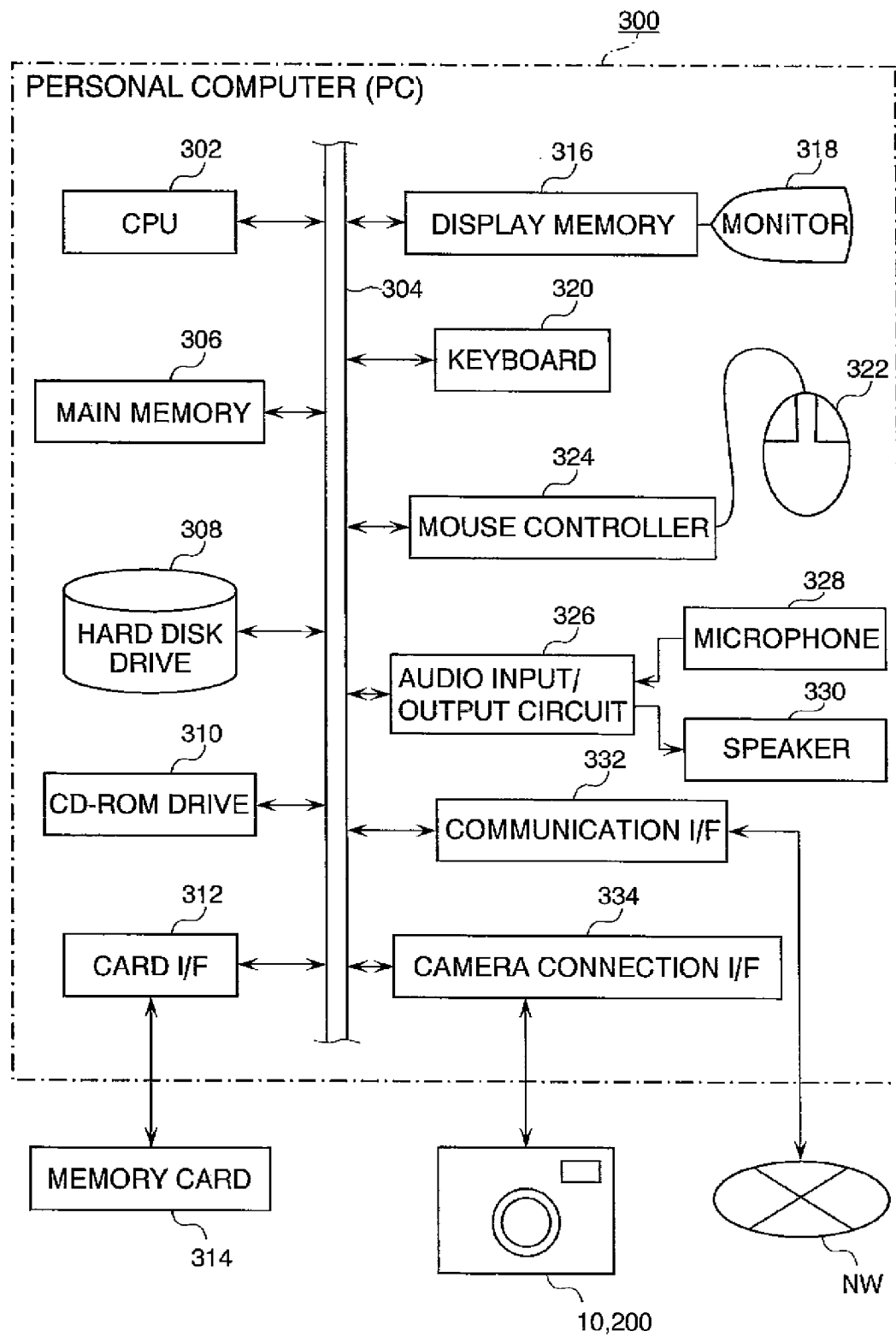
FIG. 11 is a block diagram showing main configuration of an image recording apparatus according to a fourth embodiment of the present invention.

FIG. 11 is a block diagram showing main configuration of an image recording apparatus according to a fourth embodiment of the present invention. In this embodiment, an image recording apparatus 300 is constructed of, for example, a personal computer (PC), and is an apparatus for performing reading of an image file for recording from an image pickup apparatus or a memory card 314, maintenance and edit of the image file for recording, and the like. As shown in FIG. 11, a central processing unit (CPU) 302 is connected to respective blocks in the image recording apparatus 300 through a bus 304, and controls operations of the respective blocks. Main memory 306 includes a storage area where a control program is stored, and a workspace at the time of program execution. A hard disk drive 308 stores an operating system (OS) and various kinds of application software of the image recording apparatus 300, a plurality of viewpoints of image data read from the image pickup apparatus or memory card 314, and the like. A CD-ROM drive 310 reads data from CD-ROM which is not shown. A card interface unit (card I/F) 312 reads image data in the memory card 314. Display memory 316 temporarily stores data for display. A monitor 318 is constructed of for example, a CRT (Cathode Ray Tube) monitor or an LCD monitor, and displays an image, a character, and the like on the basis of image data, character data, and the like which are outputted from this display memory 316. In addition, the display memory 316 and monitor 318 are connected via any interface of Dsub-15, DVI, and HDMI. A keyboard 320 and a mouse 322 receive an operation input from an operator and inputs a signal according to the operation input into the CPU 302. In addition, as a pointing device, a touch panel, a touchpad, or the like can be used besides the mouse 322. A mouse controller 324 detects a state of the mouse 322, and outputs signals of such as a position of a mouse pointer on the monitor 318, and a state of the mouse 322 to the CPU 302. An audio input/output circuit 326 to which a microphone 328 and a speaker 330 are connected and various kinds of sound signals are inputted reproduces and outputs various kinds of operation sound according to an operation input from the keyboard 320 or the like. A communication interface unit (communication I/F) 332 communicates with a network NW. A camera connecting interface unit (camera connection I/F) 334 transmits and receives data between with an image pickup apparatus (the compound eye camera 10, or single-lens camera 200).

The image recording apparatus 300 according to this embodiment cal achieve the image recording apparatus of the present invention by giving the processing shown in the above-mentioned FIGS. 2, 3, and 7 to the viewpoint image data concerned when a plurality of viewpoint image data, obtained by a panoramic shot, through the memory card 314 or image pickup apparatus (the compound eye camera 10 or single-lens camera 200) is acquired.

In addition, the present invention can be provided also as a program applied to an image recording apparatus such as an image pickup apparatus, a personal computer, a personal digital assistant, and an image storage unit. In addition, the present invention can be provided also as a recording medium on which the program described above is recorded. In this case, the program is installed on a device using the recording medium so that the device may realize the apparatus according to the present invention.

What is claimed is:

1. An image recording apparatus, comprising:
   an image acquisition device which acquires a plurality of image data obtained by taking images in different viewing ranges;
   a generating condition designation device which receives designation of a generating condition of representative image data;
   a representative image data generating device which generates representative image data from the plurality of image data according to the generating condition;
   an image file generating device which generates an image file which includes the representative image data and the plurality of image data acquired by the image acquisition device;
   a selection device which selects whether image data for a display output is generated;
   an aspect ratio designation device which designate an aspect ratio of the image data for a display output; and
   an image generating device for a display output which generates image data for a display output, wherein
   the representative image data generating device synthesizes a plurality of image data, acquired by the image acquisition device, generates panoramic image data, and sets it as representative image data when the aspect ratio is set as 16:9, and selects representative image data from a plurality of image data, acquired by the image acquisition device, when the aspect ratio is set as 4:3;
   the image generating device for a display output performs predetermined processing to the representative image data to generate image data for a display output; and
   the image file generating device stores the image data for a display output in the image file with the representative image data, and the plurality of image data acquired by the image acquisition device.

2. The image recording apparatus according to claim 1, wherein the generating condition designation device receives designation of an aspect ratio of the representative image data.

3. The image recording apparatus according to claim 1, wherein
the image generating device for a display output performs any processing of extension, compression, trimming, or padding to the selected image data to generate the image data for a display output.

4. An image recording method, comprising:
an image acquisition step of acquiring a plurality of image data obtained by taking images in different viewing ranges;
a generating condition designation step of receiving designation of a generating condition of representative image data;
a representative image data generating step of generating representative image data from the plurality of image data according to the generating condition;
an image file generating step of generating an image file which includes the representative image data and the plurality of image data acquired at the image acquisition step;
a selection step of selecting whether image data for a display output is generated;
an aspect ratio designation step of designating an aspect ratio of the image data for a display output; and
an image generating step of generating image data for a display output, wherein
the representative image data generating step further comprises synthesizing a plurality of image data, acquired by the image acquisition step, generating panoramic image data, and setting it as representative image data when the aspect ratio is set as 16:9, and selecting representative image data from a plurality of image data, acquired by the image acquisition step, when the aspect ratio is set as 4:3;
the image generating step further comprises performing predetermined processing to the representative image data to generate image data for a display output; and
the image file generating step further comprises storing the image data for a display output in the image file with the representative image data, and the plurality of image data acquired by the image acquisition step.

* * * * *